United States Patent [19]

Ali et al.

[11] Patent Number: 5,390,860

[45] Date of Patent: Feb. 21, 1995

[54] METHOD AND APPARATUS FOR SEPARATING PAPER FIBER AND PLASTICS FROM MIXED WASTE MATERIALS AND PRODUCTS OBTAINED THEREBY

[75] Inventors: Hyder Ali, Federal Way, Wash.; Tommy Nystrom, Lund, Sweden

[73] Assignee: Tetra Laval Holdings & Finance SA, Pully, Switzerland

[21] Appl. No.: 45,696

[22] Filed: Apr. 14, 1993

Related U.S. Application Data

[63] Continuation-in-part of Ser. No. 883,175, May 15, 1992, abandoned.

[51] Int. Cl.[6] .................... B02C 23/10; B02C 23/18
[52] U.S. Cl. ........................... 241/20; 241/21; 241/46.17; 241/79.1; 241/DIG. 38
[58] Field of Search ............... 241/21, 20, 23, 24, 241/46.17, 79.1, 152.2, DIG. 38

[56] References Cited

U.S. PATENT DOCUMENTS

| | | | |
|---|---|---|---|
| 3,741,863 | 8/1971 | Brooks . | |
| 3,814,240 | 6/1974 | Laundrie | 209/11 |
| 3,849,245 | 11/1974 | Marsh et al. | 162/4 |
| 3,925,150 | 12/1975 | Marsh | 162/4 |
| 3,945,575 | 3/1976 | Marsh | 241/20 |
| 4,017,033 | 4/1977 | Tra | 241/28 |
| 4,160,722 | 7/1979 | Marsh | 209/4 |
| 4,231,526 | 11/1980 | Ortner et al. | 241/28 |
| 4,272,315 | 6/1981 | Espenmiller | 162/4 |
| 4,283,275 | 8/1981 | Heinbockel et al. | 209/3 |
| 4,314,674 | 2/1982 | Cerroni | 241/14 |
| 4,570,861 | 2/1986 | Zentgraf et al. | 241/24 |
| 4,830,188 | 5/1989 | Hannigan et al. | 209/3 |
| 4,849,116 | 7/1989 | Weinmann et al. | 210/770 |
| 5,084,135 | 1/1992 | Brooks et al. | 162/4 |
| 5,148,993 | 9/1992 | Kashiwagi | 241/24 |
| 5,169,588 | 12/1992 | Estepp | 264/331.17 |
| 5,268,074 | 12/1993 | Brooks et al. | 162/4 |
| 5,277,758 | 1/1994 | Brooks et al. | 162/4 |

FOREIGN PATENT DOCUMENTS

| | | |
|---|---|---|
| 2171292 | 9/1973 | France . |
| 2733279 | 2/1978 | Germany . |
| 60-212434 | 4/1984 | Japan . |
| 1228276 | 4/1971 | United Kingdom . |
| 1417260 | 12/1975 | United Kingdom . |
| 2172525A | 9/1986 | United Kingdom . |
| WO92/16686 | 10/1992 | WIPO . |

*Primary Examiner*—John Husar
*Attorney, Agent, or Firm*—Burns, Doane, Swecker & Mathis

[57] ABSTRACT

A method and apparatus for separating paper fiber from mixed waste materials which contain one or more sources of paper fiber in order to obtain substantially pure paper fiber which can be recycled to high grade end uses is disclosed. In addition, the process and apparatus separates plastic with or without metal in order to obtain substantially pure plastic which can be recycled to high grade end uses.

15 Claims, 2 Drawing Sheets

METHOD AND APPARATUS FOR SEPARATING PAPER FIBER AND PLASTICS FROM MIXED WASTE MATERIALS AND PRODUCTS OBTAINED THEREBY

CROSS-REFERENCE TO RELATED APPLICATION

This is a continuation-in-part of U.S. patent application Ser. No. 07/883,175, filed May 15, 1992, now abandoned.

FIELD OF THE INVENTION

The present invention relates to methods and apparatus for separating paper fiber from mixed waste materials which contain one or more sources of paper fiber, such as cartons, newspapers, magazines, cardboard, beverage containers and the like, in order to obtain substantially pure paper fiber which can readily be recycled to high grade end uses such as for paperboard having, e.g., high brightness and low dirt content, as opposed to low grade end uses, such as for tissue paper.

BACKGROUND OF THE INVENTION

Various methods and apparatus have been proposed for separating plastic and/or plastic/metal composites from mixed waste materials which contain one or more sources of plastic and/or plastic/metal composites, such as milk containers, gable-top cartons, aseptic packages, and the like, in order to obtain substantially pure plastic which can be readily recycled to high grade end uses which call for plastic having, e.g., the ability to be blow-molded or the ability to be extruded into thin films, as opposed to low grade end uses such as plastic lumber, and/or in order to obtain plastic/metal composites which have a sufficiently high metal content to be suitable for use in the economical recovery of the pure metal. Preferably, the substantially pure plastic can be recycled into high grade end uses such as laminated paperboard products.

The source of plastic and/or plastic/metal composite may also contain, and often does contain, an amount of paper fiber. Methods and apparatus have been proposed for recovering this paper fiber in substantially pure form in order to provide additional recyclable paper fiber which can be readily recycled, also preferably to high grade end uses such as laminated paperboard products.

For example, Brooks, U.S. Pat. No. 3,741,863, discloses a method of separating and recycling cellulose fibers from waste by heating and abrading the cellulose material and then softening any resins contained therein. The separated fibers are then combined with a resin to form a mat which is compressed to form a board.

Laundrie, U.S. Pat. No. 3,814,240, discloses a method of separating waste paper from a thermoplastic film using a hot gas stream to contract the plastic and make it easier to mechanically remove the plastic particles.

Marsh, U.S. Pat. No. 3,925,150, describes a method of separating waste corrugated paperboard into neutral sulfite semi-chemical pulp and short fiber constituents. The waste is processed through two pulpers with a liquid cyclone and screening stage in between.

Trä, U.S. Pat. No. 4,017,033, addresses the problem of separating heavy and light contaminants from partially liberated fibrous materials. A centrifugal separator is used to create a high speed vortex which allows the heavy contaminants to be removed as a bottoms. A further separation means is used to remove the light contaminants.

Ortner, et al., U.S. Pat. No. 4,231,526, disclose the treatment of waste paper to separate both light and heavy foreign matter. The light foreign matter is sent to a hydrocyclone from which the recovered fibers are sent to a storage facility.

Espenmiller, U.S. Pat. No. 4,272,315, discloses a process of recovering fiber from waste paper by continuously removing plastic and lightweight trash. The pulper is equipped with different sized extraction holes to facilitate separation.

Heinbockel, et al., U.S. Pat. No. 4,283,275, disclose an auxiliary circulation system comprising a stock pulper equipped with a rotor and two screens having different sizes of mesh for the removal of contaminants from a stock suspension. Means are included to channel the stock suspension to a papermaking machine and to provide an auxiliary circuit for the removal of contaminants and rejects such as plastics and foils.

Cerroni, U.S. Pat. No. 4,314,674, discloses a method of separating an urban waste mixture of paper and plastic. The waste is initially separated and then a mix of paper and plastic film is ground such that the size of the paper is reduced without affecting the size of the plastic.

Zentgraf, et al., U.S. Pat. No. 4,570,861, disclose a method of separating paper and plastic by comminuting the mixture, triboelectrically charging the comminuted mixture and then letting the mixture pass through a free-fall separator to thereby separate the two components. An optional second electrostatic separation step may be employed.

The foregoing methods do not address the significant problems that arise when attempting to process mixed waste materials in order to obtain paper fiber and/or plastic suitable for recycling to high grade end uses, such as in laminated paperboard products in which the paperboard must meet certain brightness and dirt content requirements, and in which a plastic film is laminated to paperboard. These problems are further complicated when attempting to process mixed waste materials containing metal foil to obtain paper fiber and/or plastic suitable for use in laminated products which also include a layer of metal foil.

Laminated paperboard products are found in many forms and represent a high grade end use for recycled paper fiber and plastic due to the relatively stringent quality requirements of the several components of the products.

Laminated paperboard products are used as a packaging material, particularly in the form of cartons for storing consumable liquids like juices and milk. Cartons which generally have reclosable upper ends are typically laminated products made of paper fiber laminated on both sides with a layer of plastic such as polyethylene. This type of carton, known as a gable-top carton, is generally stored and sold refrigerated, and is typically refrigerated during use. A typical construction is a three-layer laminate having the sequential layers: polyethylene/fiber/polyethylene.

Aseptic cartons are those which are intended to have a longer shelf life. One type of aseptic carton is filled under aseptic conditions, so that the liquid contents completely fill the carton and there is no air or gas above the liquid. Filling the cartons under these aseptic conditions provides a long shelf life for the contents. The packaging may include a barrier layer which prevents oxidation of the liquid contents. This type of carton is typically provided with an area that may be punctured for inserting a straw. The straw remains in the puncture hole until the contents are consumed. The most common commercial example of an aseptic carton is an individual juice container, commonly known as a "juice box". Aseptic cartons are laminated products which include both paper fiber and plastic layers as well as a thin metal foil layer, such as aluminum foil. A typical construction includes layers of polyethylene separately sandwiching layers of paper fiber and aluminum foil, to form a five-layer laminate having the sequential layers: polyethylene/paperboard/polyethylene/foil/polyethylene.

Laminated paperboard that is used to make gable-top cartons and aseptic packages must satisfy stringent requirements. These requirements have heretofore limited, or excluded, recycled paper fiber and/or recycled plastic from being used to make such laminates.

The paper fiber used in these laminated paperboard products generally is required to be of high brightness and low in dirt content. Elevated dirt count can cause streaking problems during clay coating of the board and also may not be acceptable from an appearance point of view. Further, the paper fiber used in these laminated paperboard products must have sufficient brightness so as not to have adverse impact on the brightness of the resulting paperboard; otherwise, the resulting paperboard may not be amenable to accepting printing and/or may not be aesthetically pleasing. The board must also meet certain levels of physical strength properties, like stiffness, etc.

The plastic used in these laminated paperboard products generally is required to be very low in contaminants as well. One of the properties required of the plastics used in these laminated paperboard products is the ability to be extruded into thin films. Contaminants in the plastic, such as residual paper fiber and/or residual metal and/or elevated moisture content (which may be due in part to moisture absorption by residual paper fibers) disrupt the film-forming ability of the plastic.

With the continuing growth of the laminated paperboard product industry, particularly for packaging of consumer goods, there is an increasing need for a process of processing mixed waste materials to obtain recycled paper fiber and/or recycled plastic which can be utilized in laminated paperboard products.

Also, because laminated paperboard products such as gable-top and aseptic cartons contain plastic and/or plastic/metal composites, they are not biodegradable. With increasing concern over the environment, there is also growing pressure to find a way to separate and recycle the components of laminated paperboard products, particularly the paper fiber and plastic portions. Preferably, a method for processing mixed waste materials should allow the recycled paper fiber and/or recycled plastic to be reused in the same or similar product from which it was derived, i.e., the so-called "carton-to-carton" recycling.

SUMMARY OF THE INVENTION

The present invention is generally directed to a method of separating paper fiber from mixed waste materials which contain one or more sources of paper fiber in order to obtain substantially pure paper fiber. The paper fiber is preferably suitable to be recycled into laminated paperboard products.

The method in one of its broadest aspects comprises:

(a) agitating the mixed waste material which contains paper, plastic with or without metal in the presence of water to form a slurry comprised of a paper fiber portion and a plastic and metal portion;

(b) separating a substantial amount of the paper fiber portion from the slurry and removing plastic and metal from the slurry to form a paper fiber-enriched stream;

(c) subsequently removing contaminants from the paper fiber-enriched stream to form a clean paper fiber-enriched stream; and, optionally, (d) treating the clean paper fiber-enriched stream resulting from step (c) by flotation under conditions to further remove light contaminants from the fiber-enriched stream to thereby obtain wet paper fiber.

The present invention also includes a method and apparatus for separating the plastic and/or plastic/metal composite from mixed waste materials which contain one or more sources of plastic and/or plastic/metal composite in order to obtain substantially pure plastic, and/or in order to obtain plastic/metal composite having a high metal content, suitable for the economic recovery of the metal. The plastics and metal recovery portion of the process in one of its broadest aspects comprises:

(a) shredding the mixed waste material, preferably the residual portion of the slurry, from the above paper fiber recovery process, to increase the exposed surface area of the mixed waste material;

(b) washing the shredded mixed waste material for a time and under conditions sufficient to remove a substantial portion of heavy contaminants such as paper fibers;

(c) separating the washed mixed waste material under conditions which remove residual heavy contaminants to yield a (1) plastic stream, or (2) plastic and plastic/metal composite stream, and proceeding to optional step (e) if (1) is present, or to step (d) if (2) is present;

(d) separating the plastic and plastic/metal composite to yield a plastic fraction and a plastic/metal composite fraction; and optionally, (e) treating the plastic fraction to a further separation under conditions which remove residual plastic/metal composite to yield a plastic-enriched fraction; and, optionally, (f) treating the plastic/metal composite fraction to a further separation under conditions which remove residual plastic to yield a plastic/metal composite-enriched fraction.

The process can further include drying and pelletizing the plastic-enriched fraction to obtain substantially pure plastic suitable for use in blow molding, and preferably for use in film-forming. The process can further include drying the plastic/metal composite-enriched fraction for use in recovery of the metal therefrom.

The invention also includes apparatus for performing the various steps of the invention as described above to achieve the objectives of recovering paper fiber that can be reused and apparatus for recovering plastic and metal in an efficient manner.

In accordance with the preferred embodiments of the present invention, each of the major components of a laminated paperboard material (including paper fiber, plastic and plastic/metal composite) is separated and recovered. The recovered materials can be recycled and used to manufacture the original product, such as gable-top and aseptic cartons or, in the case of the plastic/metal composite, can be treated to recover the metal using pyrolysis.

BRIEF DESCRIPTION OF THE DRAWINGS

Preferred embodiments of the invention are illustrated in the accompanying drawings, in which.

DETAILED DESCRIPTION OF THE INVENTION

The mixed waste materials which contain one or more sources of paper fiber include newspapers, magazines, cardboard, beverage containers, such as milk cartons and/or aseptic packages, or combinations of the foregoing. These waste materials include plastic and metal foil, in addition to the paper fiber.

Laminated paperboard products which are used in the manufacture of gable-top and aseptic cartons contain a layer of paper fiber sandwiched between layers of plastic such as polyethylene. If an aluminum foil layer is present, which is generally the case in aseptic cartons, it too is sandwiched between layers of plastic, such as polyethylene.

Generally, the recovery of paper fiber from waste materials that include laminated paperboard products (or from feeds comprising other plastics such as plastic/metal composites, e.g., yoghurt containers) poses peculiar problems in that the paper fiber is subject to contamination by particulate plastic and/or metallic matter.

Figure 1:
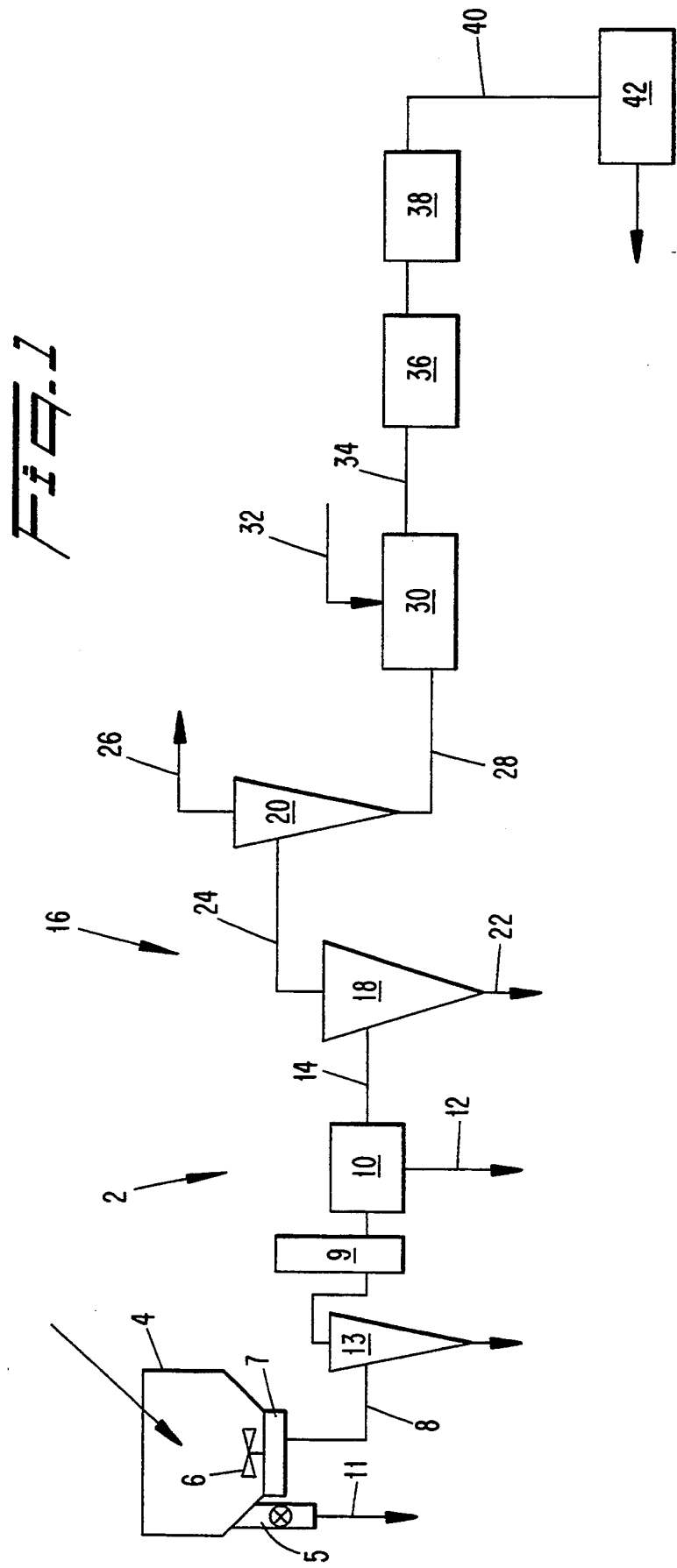
FIG. 1 is a schematic view of one embodiment of the invention for separating the paper fiber from mixed waste materials and recovering substantially pure paper fiber.

Referring to FIG. 1, a separation system 2 for separating the paper fiber component from the plastic and/or plastic/metal composites is shown. A feed of mixed waste material containing paper, plastic with or without metal, and may include laminated paperboard containers, is sent to a hydrapulper 4 where it is agitated in the presence of water to form a slurry. The feed may optionally be pretreated (such as to remove odor, bacteria and the like). Pretreatment may also include first shredding the feed and then rinsing the shredded feed in water to remove odoriferous materials as well as to soften the feed. Thereafter, the softened feed may be baled and/or treated with a bleaching agent prior to entry into the hydrapulper 4. The hydrapulper 4 contains an agitator 6 which causes turbulent mixing of the waste material with water to cause disintegration of the paper and which also delaminates the laminated paperboard and facilitates separation of paper fiber from the plastic and/or plastic/metal composites in the waste material.

During treatment in the hydrapulper 4, a chemical agent (such as sodium hydroxide and/or sodium hypochlorite) may be added to maintain the pH, deodorize, sanitize, bleach and/or improve the handling characteristics of the feed.

The hydrapulping process is preferably conducted at a temperature of about 35° C. to 75° C., preferably from about 50° C. to 65° C. at a residence time which typically varies from about 5 to 45 minutes, preferably from 15 to 30 minutes. A residence time at the low end of the range (e.g., 5 to 15 minutes) is preferred for mixed waste materials containing predominantly newspapers and magazines, at the middle of the range (e.g., 15 to 30 minutes) for mixed waste materials predominantly containing cardboard boxes and mixed waste, and at the high end of the range (e.g., 30 to 45 minutes) for mixed waste materials containing predominantly laminated paperboard products (e.g., gable-tops). The hydrapulping process is also conducted in a basic environment in which the pH is in the range of about 8.0 to 10.0.

Treatment in the hydrapulper 4 produces a slurry containing paper fibers mixed with various contaminants including suspensions of plastic particles and metal particles. Components such as agglomerations of plastic and larger metal particles tend to be easily separated from the slurry due to their size and weight. The slurry is withdrawn from the hydrapulper 4 through an extraction plate 7 at the bottom of the hydrapulper 4 and into a discharge line 8. The larger components of plastic, metal and other particles remain in the hydrapulper 4, and are removed by any suitable technique. The hydrapulper 4 may include a large discharge opening 5 with a removable cover plate to permit flushing the heavier components from the hydrapulper into a discharge line 11 after the slurry has been removed.

The slurry passes via the line 8 through a liquid cyclone 13, then through a coarse screen 9 followed by a slotted screen 10 (such as a Model 12 PH/PS pressure screen) which separates the paper fiber component from the residual component, i.e., the plastic and/or plastic/metal particles, into a paper fiber stream and a residual stream. The liquid cyclone protects the screen 9 from any large pieces of metal, stones or other hard objects that might pass through the extraction plate 7. The dimensions of the slots in the screen 10 may be adjusted to screen out contaminants while allowing the fibers to undergo further processing. Preferably, the slots are on the order of 0.004" to 0.010", more preferably on the order of about 0.006". The residual stream from the screens 9 and 10 passes from the screens through the line 12, while the paper fiber stream passes through the screens and flows into the line 14.

Referring again to FIG. 1, the paper fiber stream (containing over 99% water) is transported from the slotted screen 10 via the line 14 to a portion of the separation system 16 which includes first and second centrifugal separators 18, 20. The separators 18, 20 are cleaners which separate the feed into high and low density fractions. The high density fraction is removed from the bottom, while the low density fraction is extracted from the overhead. The paper fiber-enriched stream is treated through the use of two different types of centrifugal separators to effect the alternate separation. One type of centrifugal separator (also known as a "high density" cleaner or "forward" cleaner) is suitable for removing heavy contaminants from the paper fiber-enriched stream. The other type of centrifugal separator (also known as a "reverse" cleaner) removes light contaminants from the paper fiber-enriched stream. At least one of each type of separation (i.e., at least one heavy contaminant separation and at least one light contaminant separation) is employed. The "reverse" cleaner follows the "forward" cleaner in sequence. In accordance with the embodiment depicted in FIG. 1, the paper fiber stream is removed from the first centrifugal separator 18 as the overhead and from the second centrifugal separator 20 as the bottom.

More specifically, the paper fiber stream containing a major amount of paper fiber portion and a minor amount of residual portion is passed into the first centrifugal separator 18 (such as a 5" Ultra Clone Cleaner).

Heavier contaminants are removed from the bottom of the separator 18 via the line 22. The overhead of the separator 18 contains a major amount of the paper fiber portion and a minor amount of light contaminants (and is substantially free of heavier contaminants) comprised primarily of residual plastic and ink. The overhead paper fiber-enriched stream is removed via the line 24 and sent to the second centrifugal separator 20.

The driving force which enables the paper fiber portion of the feed to pass from the first separator 18 to the second separator 20 results from a pressure drop which is maintained between line 14 and line 24 leading to the separator 20. The difference in pressure is maintained on the order of about 10 to 30 psi, and preferably about 20 psi.

The paper fiber-enriched stream then enters the separator 20 (such as a 3″ X-Clone Through Flow Cleaner or Gyroclean) which is a horizontally arranged rotating light contaminant cleaner. There is also a pressure drop maintained across the separator of about 10 to 20 psi, preferably about 15 psi. The overhead containing light-weight contaminants (such as plastic alone or with ink) is removed via the line 26 and discarded or further treated. A substantially clean paper fiber-enriched stream is removed from the bottom of the separator 20 via the line 28.

The paper fiber-enriched stream may be treated in the separation system 16 more than once, as needed or desired, depending on the end use of the paper fiber. If the paper fiber is imprinted with ink, then a de-inking process may be used to remove an additional amount of the ink before the water is removed from the clean paper fiber-enriched stream. The de-inking process, if used, preferably includes three steps.

As shown in FIG. 1, the clean paper fiber-enriched stream is sent via the line 28 to a flotation tank 30 where compressed air is introduced via the line 32 creating a froth in which the ink particles are separated from the paper fiber. Because the ink is lighter than the paper fiber, it floats as a froth on the top of the clean paper fiber-enriched stream which is removed from the tank 30 via the line 34. The de-inked, clean paper fiber-enriched stream is then washed with water and thickened in a thickener 36, and is thereafter treated in a disperger 38 to reduce the size of the ink particles which are then broken down into very small pieces.

The de-inked, clear paper fiber-enriched stream is passed via the line 40 directly to a paper mill or is pressed in a compressor 42 to remove a substantial amount of water (from 30 to 50%) and then baled for shipment to a paper mill.

The resulting paper fiber is of high cleanliness and brightness and can be used to make new laminated paperboard products such as gable-top and aseptic cartons. Moreover, the quality of the resulting paper fiber allows the use of greater amounts of recycled paper fiber in the production of new paperboard. Illustratively, the process of the present invention results in a paper fiber of sufficiently high quality to permit the use of at least 15%, preferably at least 20%, more preferably at least 25%, and most preferably at least 30% recycled paper fiber in new paperboard. The resulting paperboard has high brightness and low dirt count, comparable to paperboard made from all virgin fiber.

One measurement of dirt count in paperboard products is the TAPPI dirt count test. The TAPPI dirt count test is a measure of the area of dirt for a given paperboard area. Higher TAPPI dirt count corresponds to a board with more specks. The TAPPI dirt count ($mm^2/m^2$) for a paperboard product containing 30% of recycled paper fiber obtained according to the process of the present invention is generally less than about 100, preferably less than about 80, more preferably less than about 40, and most preferably less than about 20. For a paperboard product containing about 10% of recycled paper fiber obtained according to the process of the present invention, the TAPPI dirt count is generally less than about 40, preferably less than about 30, more preferably less than about 20, and most preferably less than about 10.

The brightness of paperboard product containing 15% of recycled paper fiber obtained according to the process of the present invention is generally above 80, preferably above 80.5, and more preferably above 81. The recycled paper fiber obtained according to the present process generally has a brightness of greater than about 78, preferably equal to or greater than about 80.

If the objective of the process is primarily to recover the paper fiber, the non-paper components of the waste starting material can be simply discarded, including the plastic and metal components from the hydrapulper 4 and from the screens 9 and 10 through the line 12. However, the process of this invention permits the recovery and reuse of the plastic components, in addition to the recovery of paper fiber.

Figure 2:
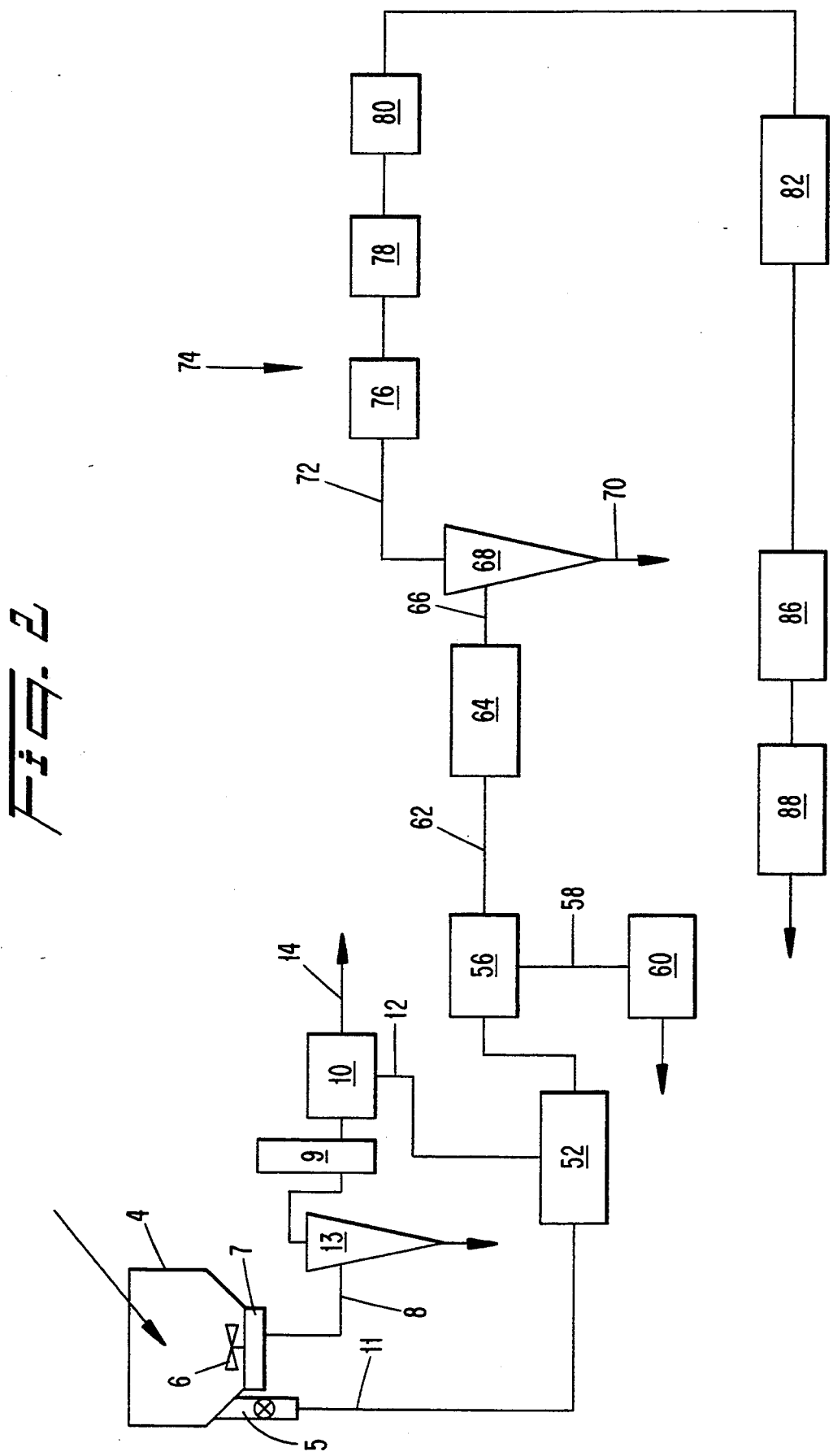
FIG. 2 is a schematic view of another embodiment of the invention in which a combination of the plastic and plastic/metal composite are treated to recover plastic (with or without metal) and paper fiber.

Referring to FIG. 2, the stream containing plastic/foil/fiber (and other heavy components) composite from the hydrapulper 4 is supplied through the line 11 to a grinder 52 which reduces the size of the particles of the residual stream, preferably within the range of 20 mm×20 mm to 10 mm×10 mm or smaller. The grinder is a conventional device.

The ground residual stream is sent via a line 54 to a mechanical agitation device 56 which separates residual paper fiber from the remaining (if any) heavy particles and the plastic and/or plastic/metal composite of the residual stream. The device 56 may be a hydrapulper similar to the hydrapulper 4, or a combination of a flotation tank and cyclone separator. Preferably, the separation is carried out by a turbowasher operating at 1,000–1,5000 rpm in conjunction with a basket screen with holes on the order of 2–5 mm, allowing the residual fiber stream to pass through and retaining the remaining (if any) heavy contaminants and the plastic and/or plastic/metal composite portion of the residual stream, which produces a residual paper fiber stream containing about 99% water. The residual paper fiber stream passes via the line 58 through a screen assembly 60 which removes residual heavy contaminants and reduces the water content to about 90%. The fiber thus recovered can be added back to the paper fiber enrichment process, for example through the line 24 (FIG. 1), to further clean and remove plastic contaminants or it may be used without further processing.

The washed residual stream containing the remaining heavy contaminants and plastic and/or plastic/metal composite, generally contains predominantly free plastic, as well as a smaller amount of the plastic/metal composite, and possibly other residual components such as paper fibers, which still remain in the device 56. The contents of the device 56 are forwarded as a water stream via a line 62 to one or more sedimentation tanks 64. One sedimentation tank may suffice for the preparation of free plastic from the plastic/metal composite if the washed residual stream is substantially free of other heavy contaminants. However, in practice, it may be beneficial to employ a series of, e.g., two sedimentation tanks 64. The first serves to remove substantially all of the heavy contaminants (other than plastic/metal composites) which remain in the washed residual stream; this results in a stream exiting the first sedimentation tank which is comprised of substantially only a combination of free plastic and plastic/metal composite. The second sedimentation tank is thus used to separate the free plastic (less dense) from the plastic/metal composite (more dense). This results, with the further processing described below, in a recycled free plastic portion which is suitable for film-forming applications and a recycled plastic/metal composite with sufficiently high metal content (e.g., 20% in the case of aluminum) to make recovery of the metal economically feasible.

In the first sedimentation tank (if two are used), the flow can be more turbulent than in the second sedimentation tank. This takes advantage of the greater differential in density of the heavier contaminants (on the order of 1.5 kg/m$^3$) as compared to plastic (0.92 kg/m$^3$ for low density polyethylene) and plastic/metal composites (about 1.06–1.09 (calculated theoretical) for polyethylene/aluminum foil laminates). Those skilled in the art can determine appropriate flows to effect separation based on density differentials without due experimentation.

The stream entering the second sedimentation tank 64, if two are used, is caused to undergo a substantially laminar flow so that the less dense free plastic separates from the heavier plastic/metal composite. The use of the laminar flow sedimentation tank 64, either alone or as the second sedimentation tank, results in a recycled plastic which allows for the use of more than double the amount of recycled plastic to be incorporated with virgin plastic, as compared to recycled plastic resulting from processes in which the sedimentation tank is not employed.

The overflow from the sedimentation tank 64, containing a major amount of the free plastic portion and a minor amount of the plastic/metal composite, is transported via the line 66 to a centrifugal separator 68 of the same or similar type as the first centrifugal separator 18.

In operation, the separator 68 produces a less dense fraction, comprised primarily of free plastic portion and having a very small amount of plastic/metal composite, and a more dense fraction which is removed from the bottom of the separator 68 via the line 70. The more dense fraction contains a predominant amount of the plastic/metal composite which may be further processed to recover the metal and/or plastic therefrom.

In practice, a plastic and plastic/metal composite feed to a laminar flow sedimentation tank containing about 94.6% polyethylene and about 5.4% aluminum would yield a sedimentation fraction (aluminum fraction) comprised of 80.5% polyethylene and 19.5% aluminum and an off-flow fraction (polyethylene fraction) comprised of 95.9% polyethylene and 4.1% aluminum.

The aluminum fraction passes through two separators in series with the bottoms from the first separator (enriched aluminum fraction) being passed to the second separator. The bottom from the second separator would contain about 78.8% polyethylene and about 21.2% aluminum, sufficient to allow economical recovery of the aluminum. Further separators will lead to higher aluminum content, and the use of only one separator may suffice in a particular application.

The polyethylene fraction is passed through two separators in series with the overhead from the first separator (enriched polyethylene fraction) being passed to the second separator. The overhead of the second separator should be comprised of about 97.8% polyethylene and about 2.2% aluminum. Further separators can be used to reduce the aluminum content to at or below about 1%, and the use of one separator may suffice in a particular application. The amount of residual aluminum may also be reduced directly by the extrusion of the enriched polyethylene fraction, as described below.

The bulk of the plastic/metal composite, including the bottoms from the separator 68, may be treated in a conventional manner to recover the metal or the plastic. The residual water content after drying should be less than 1%. For example, the plastic/metal composite may be pyrolyzed under environmentally controlled conditions to recover the metal foil. Alternatively, the plastic/metal composite may, for example, be reacted with a suitable solvent to dissolve the plastic and recover the metal and plastic.

The plastic is transported via the line 72 to a drying system 74. In the embodiment shown in FIG. 2, the drying system 74 includes a vibrating screen 76, a screw press 78 and a hot air dryer 80 to remove a substantial amount of the water from the free plastic. The residual water content after drying should be less than 1%.

A rotating drum pulverizer 82 may be used to substantially pulverize the dry material into dust after the plastic has been dried in the hot air dryer 80. The dust then melts by friction and is passed into an extruder 86. As it is extruded, the material is passed through a continuous screen changer 88 which removes large pieces of residual contaminants and metal. The mesh size of the screen is preferably less than 100 $\mu$m.

Thereafter, the substantially pure plastic can be pelletized in a customary manner and combined with virgin plastic in a weight ratio of from 1:4 to 2:5 (recycled:virgin) for use in making the laminated paperboard product.

In accordance with the present invention, a substantially pure plastic portion may be obtained which is suitable for use in film-forming applications, and there is also obtained plastic/metal composite (e.g., plastic/aluminum foil composite) having sufficiently high amounts of metal (e.g., 20% in the case of aluminum) suitable for economic recovery by, e.g., aluminum processors. Substantially all of the components of the mixed waste material can therefore be recycled to high grade end uses. The paper fiber and plastic can be recycled to, e.g., a laminated paperboard manufacturing product, and the plastic/metal composite can be recycled to obtain the metal component. The recycled plastic (e.g., polyethylene) which is used as part of the laminated paperboard product is classified by its mechanical and chemical properties, and by its purity. If the recycled plastic is contaminated with impurities, such as paper fiber or metal, e.g., aluminum, in excess of about 1%, the screening system of an extruder used to pelletize the recycled plastic will quickly plug, resulting in reduced productivity. Also, in the production of plastic films, more than 1% paper fiber in the plastic results in, inter alia, increased hygroscopy of the plastic and more than 1% of metal in the plastic results in, inter alia, "lace curtains" during film-forming. Therefore, any plastic which is considered for recycling must be substantially pure (i.e., substantially free of paper fiber and metal, i.e., having 1% content), even though the recycled plastic typically is mixed with virgin plastic.

The combination of steps of the present invention for the recovery of paper fiber, when used in combination (if desired), can provide for substantially complete recovery of the paper fiber from the paper fiber sources of the mixed waste materials. Moreover, this paper fiber is substantially pure in that it is essentially free of light and heavy contaminants. This paper fiber also has substantially improved dirt content and brightness, as described above, than was heretofore believed possible to achieve.

If the residual portion of the mixed waste material, when freed of residual paper fibers, contains only plastic and does not contain any plastic/metal composite or other heavy contaminants, this plastic portion will be of suitable cleanliness to be recycled. Because of the removal of the residual fiber, this plastic portion is not limited to low end uses (as is the case in the prior art), but is suitable for use in the manufacture of, e.g., plastic films. It is thus suitable for recycling back into other laminated paperboard products.

While this invention has been illustrated and described in accordance with certain preferred embodiments, it is recognized that variations and changes may be made therein without departing from the scope of the claims.

What is claimed is:

1. A method of separating paper fiber from mixed waste materials which contain sources of paper fiber and plastic, said method comprising:
    (a) agitating the mixed waste materials in the presence of water in a hydrapulper to form a slurry comprised of a paper-fiber portion and a plastic portion;
    (b) extracting water and plastic and a substantial amount of the paper-fiber portion from the slurry out of the hydrapulper to form a liquid stream;
    (c) removing plastic from the liquid stream by passing the stream in sequence through a coarse screen and a slotted screen to produce a paper fiber-enriched stream;
    (d) subsequently removing light contaminants from the fiber-enriched stream to thereby obtain wet paper fiber.

2. The method as claimed in claim 1, wherein in step (c) the paper fiber-enriched stream is first treated in a first centrifugal separator to separate heavy contaminants from the paper fiber-enriched stream and then treated in a second centrifugal separator to separate light contaminants from the paper fiber-enriched stream.

3. The method as claimed in claim 2 including maintaining a pressure differential between said first separator and said second separator of between about 10 and 30 psi to cause flow from the first separator to the second separator.

4. The method as claimed in claim 2 wherein said slotted screen has slots between about 0.004 and 0.010 inches in width and the fiber-enriched stream passing out of the slotted screen contains at least 99% water.

5. The method according to claim 1, including the additional step of passing the paper fiber-enriched stream through a floatation tank for separating ink particles from the paper fiber-enriched stream.

6. Apparatus for separating paper fiber from mixed waste materials which contain one or more sources of paper fiber, said apparatus comprising:
    (a) chamber means for agitating the mixed waste material in the presence of water to form a slurry comprised of a paper fiber portion and a non-paper fiber solids portion;
    (b) extraction means for separating a substantial amount of the paper fiber portion from the slurry to form a paper fiber-enriched stream;
    (c) conduit means for conducting said stream from said extraction means to a pulp discharge outlet;
    (d) screen means between said outlet and said extraction means for separating paper fibers from plastic and metal components in said stream;
    (e) first centrifugal means between said screen means and said discharge outlet for removing heavyweight contaminants from the paper fiber-enriched stream; and
    (f) second centrifugal means between said first centrifugal means and said discharge outlet for removing light weight contaminants from the paper fiber-enriched stream to thereby obtain a wet paper fiber pulp.

7. The apparatus according to claim 6 including flotation tank means between said second centrifugal means and said discharge outlet, the flotation tank including means for introducing air into the fiber-enriched stream for the removal of ink particles.

8. The apparatus according to claim 6 including transfer means for conveying plastic and metal components from said screen means to an extruder means.

9. Apparatus for separating paper fiber from mixed waste materials which contain one or more sources of paper fiber, said apparatus comprising:
    (a) chamber means for agitating the mixed waste material in the presence of water to form a slurry comprised of a paper fiber portion and a non-paper fiber solids portion;
    (b) extraction means for separating a substantial amount of the paper fiber portion from the slurry to form a paper fiber-enriched stream;
    (c) conduit means for conducting said stream from said extraction means to a pulp discharge outlet;
    (d) screen means between said outlet and said extraction means for separating paper fibers from plastic and metal components in said stream;
    (e) transfer means for transferring plastic and metal components from said screen means to a plastic outlet;
    (f) grinder means for grinding said components, said transfer means arranged to transfer said components to the grinder means, said grinder means being between said screen means and said plastic outlet;
    (g) plastic extruder means, said transfer means arranged to transfer said components from said grinder means to said extruder means, said extruder means being between said grinder means and said plastic outlet.

10. The apparatus according to claim 9 including sedimentation tank means for removing heavy contaminants by sedimentation, said tank means being between said grinder means and said extruder means.

11. The apparatus according to claim 10 including pulverizer means for pulverizing plastic and metal components, said pulverizer means being between said tank means and said extruder means.

12. The apparatus according to claim 11 including drying means for drying plastic and metal components, said drying means being between said tank means and said extruder means.

13. A method of separating plastic and metal components from paper fiber in mixed waste materials which contain sources of paper fiber, plastic and metal, the method comprising:
    (a) agitating the mixed waste materials in the presence of water in a hydrapulper to form a slurry comprised of a paper fiber portion and a plastic and metal portion;
    (b) extracting water and plastic and metal and a substantial amount of the paper fiber portion from the slurry to form a liquid stream out of the hydrapulper;
    (c) removing plastic and metal components from the liquid stream;
    (d) transferring the removed plastic and metal components to a grinder;
    (e) grinding the plastic and metal components in the grinder;
    (f) separating plastic components from metal components after the grinding step;
    (g) drying plastic components from the separating step;
    (h) supplying the dried plastic components to an extruder; and
    (i) extruding the plastic components.

14. The method according to claim 13 wherein said separating step includes supplying the plastic and metal components to a sedimentation tank to allow the more dense components to settle out and the plastic components to be removed with the water stream.

15. The method according to claim 13 including pulverizing the dried plastic components before supplying the plastic components to said extruder.

* * * * *